United States Patent [19]
Albal

[11] Patent Number: 5,826,034
[45] Date of Patent: Oct. 20, 1998

[54] SYSTEM AND METHOD FOR TRANSMISSION OF COMMUNICATION SIGNALS THROUGH DIFFERENT MEDIA

[75] Inventor: Nandakishore A. Albal, Largo, Fla.

[73] Assignee: Paradyne Croporation, Largo, Fla.

[21] Appl. No.: 695,033

[22] Filed: Aug. 9, 1996

[51] Int. Cl.$^6$ ....................................................... G06F 5/00
[52] U.S. Cl. ....................................................... 395/200.69
[58] Field of Search ........................ 364/DIG. 1, DIG. 2; 395/200.69, 761, 500, 326, 329, 180, 200.3, 200.5, 200.57, 200.62, 200.68; 340/825.03, 268.01, 284.3

[56] References Cited

U.S. PATENT DOCUMENTS

4,837,798  6/1989  Cohen et al. ............................ 379/88
5,381,527  1/1995  Inniss et al. ....................... 395/200.69

*Primary Examiner*—Robert B. Harrell
*Attorney, Agent, or Firm*—Thomas, Kayden, Horstemeyer & Risley, L.L.P.

[57] ABSTRACT

An end-to-end ubiquitous payload delivery system and method transfers a payload using multiple communication method following rules established by a sender. The payload transfer is attempted using a preferred media until the parameters of the transfer are exceeded (i.e., a certain number of attempts in a given duration of time), after which one or more alternative media are used until the payload transfer is completed. Prior to the completion of the transfer, the sender has the capability of querying the payload delivery system to determine the status of the payload. Upon completion of the delivery, the sender receives notification.

37 Claims, 10 Drawing Sheets

| | |
|---|---|
| NAME: John Doe | |
| E-MAIL: John@internet.com | Number of Retries: before Media Change 10 |
| | Interval between Retries: : 5 min |
| | Secondary Media: Fax |
| | Tertiary Media: Fax-Print |
| FAX: (770)555-0000 | Number of Retries: before Media Change 10 |
| FAX-Print: (770)555-1111 | Interval between Retries: : 15 min |
| | Secondary Media: Fax-Print |
| | Tertiary Media: None |
| Address: 120 Sunny Lane | Interval between Retries: : 15 min |
| Atlanta, Georgia 10002 | Secondary Media: None |

SYSTEM AND METHOD FOR TRANSMISSION OF COMMUNICATION SIGNALS THROUGH DIFFERENT MEDIA

FIELD OF THE INVENTION

The present invention generally relates to payload delivery and, more particularly, to an end-to-end payload delivery system and method that effectuates delivery in a media independent manner following the parameters of the delivery that are defined by the sender.

BACKGROUND OF THE INVENTION

Over the ages, the types of media by which people have shared information have changed in stride with advancements in technology, as is especially evident in the present electronic age. Consequently, today there are numerous media for transferring information in a faster and in a more efficient manner than ever before. Examples of such media presently being used include telephone (voice-mail), e-mail, fax, etc., each of which has its own advantages and disadvantages. As a result, in the current competitive market place, reliable communication and the choice of media has come to play a critical role in the success (if not survival) of many businesses, especially those that are geographically diversified. Particularly, the ability to communicate specific information to a person or entity in a reliable, cost effective, and efficient manner is now more of a necessity than a luxury. Moreover, all indications are that this ability to communicate will only increase in importance in the coming years as an individual's time becomes more costly because businesses are driven to even greater efficiencies, and as the Internet and the Information Superhighway (e.g., the National Information Infrastructure (NII) or the Global Information Infrastructure (GII)) become globally accessible.

A problem created by having all these different media of communication available is the inability to communicate between the different media. Presently, several communication systems exist that allow a recipient to receive communications in a limited number of different media and then to convert them into a native media. An example of such a system is disclosed in U.S. Pat. No. 4,837,798, issued on Jun. 6, 1989, to Cohen et al., which provides for a single electronic mailbox for receiving messages in different media such as telephone or fax. In the patent to Cohen et al, the unified message system located at the recipient's end converts all the received messages in the user's electronic mailbox into a single native media. This system provides a certain amount of versatility in that the user can receive messages in a given media and covert those messages into a native media of the user. However, the media conversion only occurs post-delivery which prevents the sender from taking advantage of tariffs and competitive service offerings across available media. Further, this system fails to provide any one of the following: acknowledgment or notification to the sender that the recipient actually received the message, acknowledgment or notification to the sender of the success or failure of the message conversion, or a retry mechanism.

Therefore, a heretofore unaddressed need exists in the industry for a payload delivery system that eliminates the incompatibility between different communication services employing different media for communicating information, and that enables the sender to designate the delivery parameters as well as provides notification to the sender when the recipient receives the payload, notification to the sender if the delivery was not successful, including a request for additional instructions in such a situation, and that allows the sender to query the status of the messages sent.

SUMMARY OF THE INVENTION

The present invention overcomes the inadequacies and deficiencies of the prior art as discussed herein before and as well known in the industry. The present invention provides for a system and method for end-to-end ubiquitous payload delivery that is essentially the electronic equivalent to registered mail with the advantages of speed, configurability, convenience, resource conservation, timeliness, but without the drawbacks of the manual system used with registered mail, e.g., paperwork, delay, time utilization, and geographic limitation of applicability. By utilizing the payload delivery system of the present invention, a sender is able to establish delivery parameters that are complimented by a smart delivery system so as to ensure that the payload is delivered within the set parameters. The delivery parameters preferably include a preferred media of delivery and a number of attempts within a given period of time before conversion of the payload to an alternate media that also has a number of attempts in a given period of time designated before yet further media conversions are performed. If required, media conversions and payload copying can be performed at one or more locations where the system resides in order to take advantage of tariffs, special offerings, etc., and to provide guaranteed delivery in a media independent environment. Further, the sender can designate events that trigger notification during delivery of the payload so that the sender is able to keep track of the delivery and receipt of the payload. Accordingly, the sender who knows the makeup of the payload and who traditionally bears the cost of delivery can tailor the payload delivery in order to guarantee receipt and to ensure that the delivery is effectuated in a cost effective and efficient manner.

Briefly stated, an end-to-end ubiquitous payload delivery system in accordance with the present invention comprises a computer program that can be located at any one or more of the following: a senders desktop workstation, a server at the sender's end, a server at the receiver's end, a server connected to a digital switch at either the sender's or recipient's end, or a server in the Internet environment. As a computer application, the end-to-end ubiquitous payload delivery system allows different communication service applications on different media (e.g., e-mail, voice mail, or fax over twisted-pair, coax, untethered/wireless, fiber media) to interoperate across network lines regardless of the underlying communication protocols, operating systems, or databases. This is achieved by converting the entire payload, or a portion of the payload, from its original media to one or more other media as required to complete delivery of the payload in accordance with the delivery parameters defined by the sender. The conversion is performed by the payload delivery system, and therefore, can take place more than once and at one or more different locations where the payload system resides. Accordingly, the payload delivery system of the present invention is able to guarantee delivery of the entire payload.

Further, the end-to-end ubiquitous payload delivery system of the present invention can be used with value-added services, that is, standardized communication services such as Directory Services, Business/Accounting Services, Security Services, Compression Services, and Language Services. Directory Services, as delineated in X.500 series of ITU Standards, provides transparent address translation services to the users. Business/Accounting Services provides for the recording of the details of the delivery that are subsequently used for system analysis, upgrades, and the generation of billing for the services rendered. Security Services include, but are not limited to, providing encryption, authentication, and validation service to the users. Compression services provide compression appropriate to the payload (e.g., voice compression, video compression, or data compression), enabling efficiencies in storage and transmission. Lastly, Language Services provide conversion of the payload from one language to another.

In architecture, the payload delivery system of the present invention is configured in computer-based hardware comprising one of the possible locations identified above, though preferably implemented in a desktop workstation computer or a computer-based server. Regardless, the hardware suitable for implementing the present invention includes the appropriate network interfaces, support system interfaces (if a server), a central processing unit (CPU), memory (both random access memory (RAM) and a hard disk), and other necessary interfaces as well known in the industry. The payload delivery system is preferably stored in the memory and includes an input manager and an output manager for processing incoming and outgoing payloads, respectively. For purpose of the present disclosure, a payload can take the form of any digital compilation of data, such as but not limited to a fax, voice mail, paging message, or e-mail (may comprise one or more of the following: text data, image data, video data, audio data, or any combination thereof). Supporting functionality is provided by a copier, a media/protocol converter, a scheduler, an archive, a message store, and a value-added services mechanism. The input manager receives outgoing payloads compiled by the sender in a particular media for delivery to a designated recipient. The input manager checks the payload for validity (e.g., adherence to protocols and error free receipt), checks the address of the payload, and then stores a single copy of the payload in the payload store. It is noted that the payload can be stored in an encrypted/unencrypted, compressed/uncompressed form, as dictated by the system parameters. The input manager also checks to see if any media or protocol conversions or copies are necessary, or if any of the value-added services are required to operate on the payload, and if so, whether this should take place locally or at a remote server or workstation having the payload delivery system. If the conversion is to take place locally, then the input manager sends the payload to the media/protocol converter for conversion, and subsequently to the output manager. Otherwise, the input manager sends the payload to the output manager for delivery. The scheduler works in conjunction with the input and output managers to schedule delivery of messages to take advantage of tariffs, and resource availability.

An application interface is connected to the input manager and the output manager for receiving payloads from and placing payloads on the associated network for delivery. The application interface may contain or interface with a network interface that allows the invention to interface to the appropriate network, examples of which include a local area network (LAN) or an Access Network.

In the case of an incoming payload, the input manager receives the payload, determines if media conversion is necessary, and if so, then sends the payload to the media/protocol converter. The input manager further coordinates the copying of the payload by the copier and the storage of the payload in the payload store. The input manager then sends the payload to the output manager in order to complete delivery of the payload by providing the recipient with a copy, or in order to send the payload on to a next payload delivery system location that is in route to the recipient. The output manager is essentially a slave of the input manager in that the output manager is typically instructed what to do with the payload by the input manager.

In addition, the input manager can send a message to the sender via the output manager to notify the sender whether the delivery was successful, whether the recipient has received the payload, or whether the payload has been sent to the next payload delivery system location in route. Further, the input manager can utilize the output manager to send a message to the sender in order to request the sender for additional instructions if the delivery was not successful, or in order to allow the sender to query the status of a sent payload. The notifications received by the input manager that are destined for another payload delivery system are merely passed to the output manager and sent to the next payload delivery system. The notifications received by the input manager for that payload delivery system are provided to the sender.

It is envisioned that on successful delivery to the recipient, the invention maintains an archived copy of the payload with the delivery details for a duration that is consistent with security, business and service parameters.

The present invention can also be conceptualized as providing for a payload delivery method for providing media independent, guaranteed delivery of a payload in accordance with delivery parameters defined by the sender. The payload delivery method can be broadly generalized as follows. Initially, the sender generates a payload for delivery in a first media, for instance, an e-mail or fax. Next, the sender establishes the parameters of the delivery, including the number of attempts within a given period of time, the allowable cost of transmission, the types and/or frequency of notification, etc. The payload is then passed on to the payload delivery system for delivery to the recipient. The payload delivery system can be located at the sender's desktop workstation, the sender's or receiver's server, or a digital switch at either the sender's or receiver's end. The payload delivery system performs the function of converting the entire payload (or, a portion thereof), if necessary, from the first media to an alternate media in order to complete delivery of the payload to the recipient. For example, if the sender prepared an e-mail in a format that is not compatible with the e-mail of the recipient, or could not be delivered as an e-mail, then the present invention converts the sender's e-mail message into a format compatible with the recipient's e-mail, or alternatively, from e-mail to fax. As yet another alternative, the present invention may convert the protocol of the payload to one compatible with the protocol recipients system. Consequently, if the e-mail proves undeliverable for whatever reason, then the e-mail of the sender is converted into an alternate media designated in the delivery parameters so that further attempts at delivery can be made in accordance with the delivery parameters. As a part of the present invention, notifications that the recipient could receive are that the recipient has received the payload, that delivery by a specified media has not been successful, or that a media conversion was performed. The sender, on the other hand, not only may receive the same notifications as those provided to the recipient, the sender is preferably always given notification of delivery so that the sender is guaranteed that the payload has been received by the recipient.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The present invention can be better understood with reference to the following drawings. The elements of the drawings are not necessarily to scale, emphasis instead being placed upon clearly illustrating the principles of the present invention. Furthermore, referenced numerals designate corresponding parts throughout the several views.

FIGS. 5, 6, 7, 8, 9, and 10 are illustrative examples of payload delivery with the delivery payload system of FIG. 2.

DETAILED DESCRIPTION OF THE PREFERRED EMBODIMENT

The following description is of the best presently contemplated mode of carrying out the present invention. This description is not to be taken in a limiting sense, but is made merely for the purpose of describing the general principles of the invention. Consequently, the scope of the invention should be determined by referencing the appended claims.

I. Architecture

Figure 1:
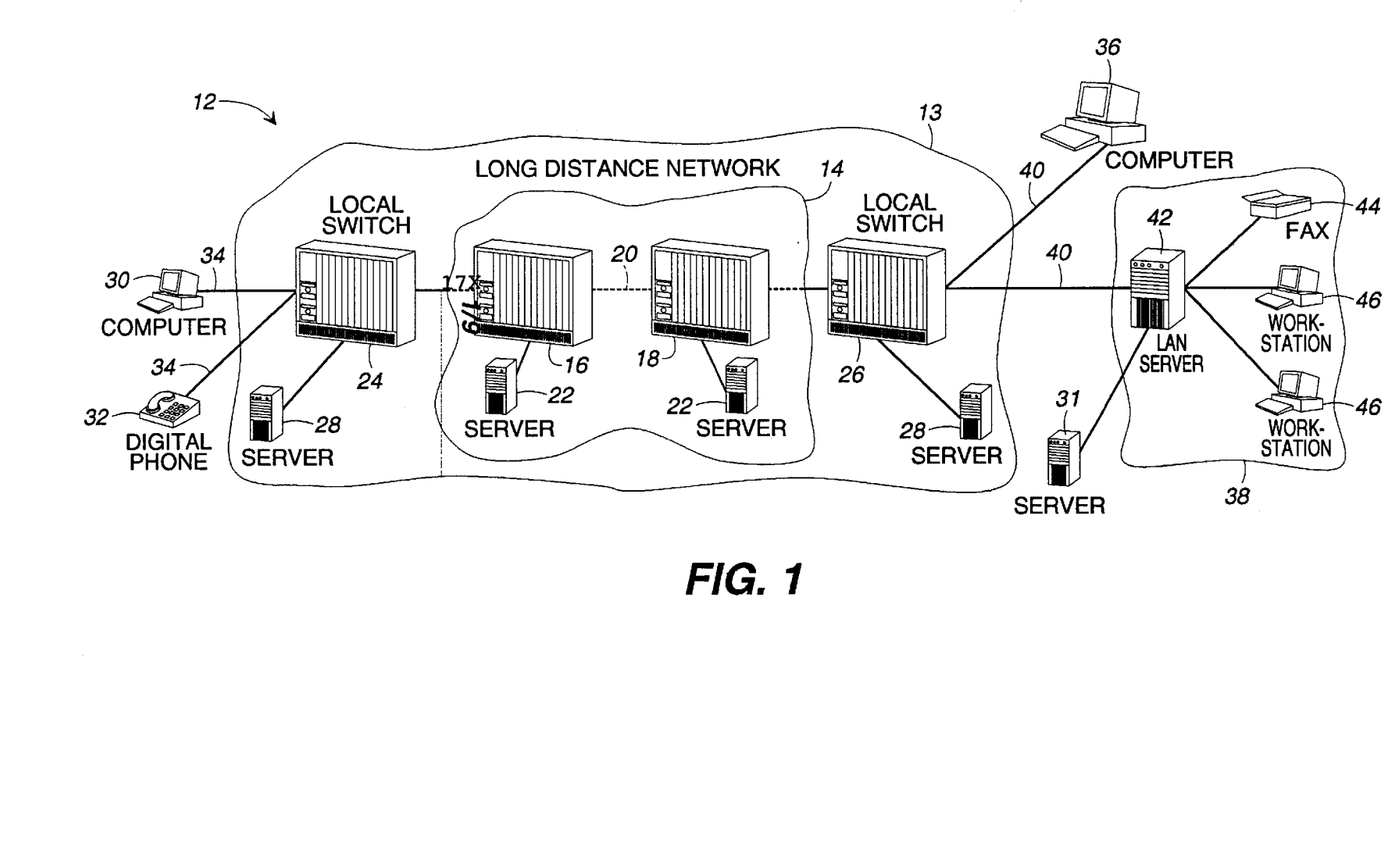
FIG. 1 is a block diagram of a communication network incorporating the end-to-end, guaranteed, ubiquitous payload delivery system of the present invention.

With reference to FIG. 1, the end-to-end ubiquitous payload delivery system of the present invention provides a payload delivery system and associated methodology that can be employed in connection with a communication network 12 for the purpose of providing guaranteed payload delivery between users in a media independent environment. The payload delivery system is preferably implemented as a computer program for use by or in connection with a computer-based system such as a workstation or a server. As such, the payload delivery system is essentially a computer application that can be stored on any computer-readable medium, such as but not limited to electronic, magnetic, optical, or other physical device or means that can contain or store a computer program for use by or in connection with a workstation or server in the communication network 12. Accordingly, the payload delivery system is a platform independent application with a versatility of being able to be located in one or more locations within the communication network 12 as described in more detail below.

The communication network 12 comprises a wide area network (WAN) 13, a local area network (LAN) 38, and a plurality of subscribers (e.g., 30, 32, 36). The WAN 13 includes a long distance portion 14, a first local digital switch 24, and a second digital switch 26. The long distance network portion 14 enables both domestic and international long distance services via a first long distance digital switch 16 and a second long distance digital switch 18 which are remotely located with respect to one another and interconnected by a transport link 20. For purposes of the present invention, the transport link 20 may comprise any one of a variety of transport technologies such as fiberoptics, wireless (e.g., radio frequency (RF) or satellite). A long distance server 22 that includes the payload delivery system of the present invention can be connected to either of the digital switches 16, 18.

Interconnected by the long distance network portion 14 are the first local digital switch 24 and the second local digital switch 26. The first and second local digital switches 24, 26 are those commonly utilize by a local exchange carrier (LEC) for switching in a regional network, as well known in the industry. Therefore, calls originating or terminating within the particular regional network of a local digital switch 24, 26 are routed by the local digital switch 24, 26 hosting that regional network to the designated recipient. A local server 28 that includes the payload delivery system of the present invention can be connected to either of the local digital switches 24, 26.

Within the regional network of each local digital switch 24, 26 are a plurality of subscribers such as a computer workstation 30 or a digital phone 32 that are interconnected to the first local switch 24 via respective subscriber lines 34, or a computer workstation 36 that is interconnected with the second local data switch 26 via the subscriber line 40.

As illustrated in FIG. 1, the LAN 38 comprises a LAN server 42 that networks a plurality of customer provided equipment (CPE) such as a fax machine 44 and a plurality of work stations 46. It is worth noting at this point that the interconnections 34, 40 can be, but are not limited to, fiberoptics, wireless, RF, coax or twisted pair. A local server 31 that includes the payload delivery system of the present invention can be connected to the LAN server 42.

In accordance with an important feature in the present invention, the payload delivery system of the present invention does not have to be located at any one particular location in the communication network 12, but may reside in a variety of different locations including at least any one or more of the following: the workstation 46, the computer workstations 30, 36, the LAN server 42, the local server 31 associated with the LAN 38, the local servers 28 associated with local switches 24, 26, or the long distance servers 22 associated with long distances switches 16, 18. In addition, if the transport link 20 comprises a satellite, the payload delivery system of the present invention may reside in the satellite. However, it is preferred that the payload delivery system of the present invention be supported at more than one location in order to provide redundancy and load management capability.

Figure 2:
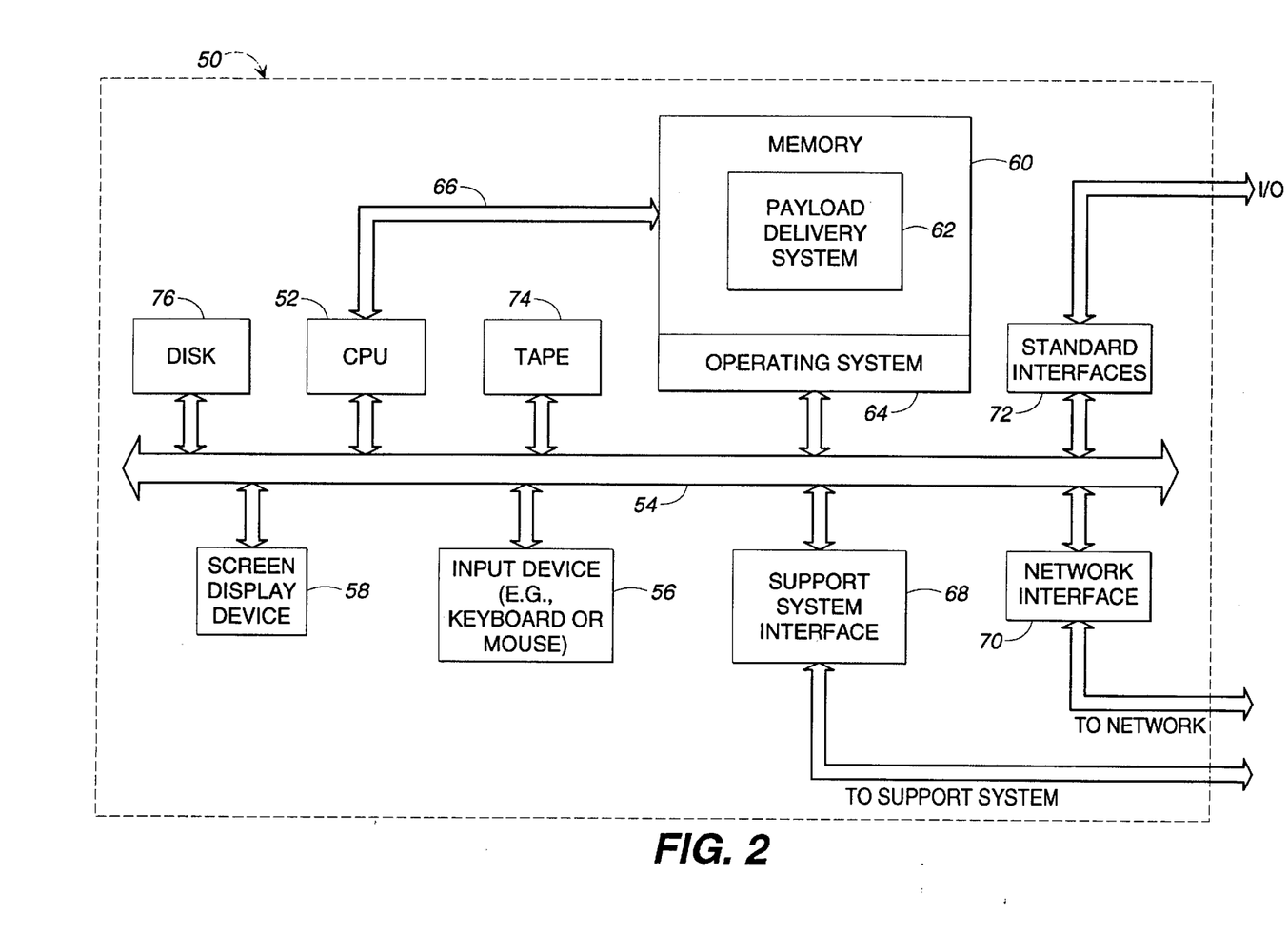
FIG. 2 is a block diagram of an illustrative computer system that includes the payload delivery system of the present invention.

With reference to FIG. 2, shown is a computer system 50 illustrative of a typical computer architecture found in workstations and servers, and that is suitable for employing the payload delivery system of the present invention. Accordingly, as mentioned above, the computer system 50 that is implementing the payload delivery system of the present invention can be any one or more of the workstation 46, the LAN server 42, the local server 31, the workstations 30, 36, the local servers 28, or the long distance servers 22. Note, the computer architecture illustrated in FIG. 2 is well known in the art and is provided merely for the purposes of describing the present invention.

The computer system 50 comprises a conventional central processing unit (CPU) 52 that communicates to other elements within the computer system 50 via a system interface 54. The system interface 54 contains both data and control buses which are shown as combined in order to simplify the computer system 50. The CPU 52 is preferably capable of running processes in order to support the functionality of the payload delivery system of the present invention. An input device 56, for example, a keyboard or mouse, is used to input data from a user of the computer system 50, and a screen display device 58 is used to output data to the user. A memory 60 within the computer system 50 stores the payload delivery system 62 which communicates with a conventional operating system 64 for the execution of the payload delivery system via the CPU 52. A memory bus 66 is preferably provided to interconnect the CPU 52 and memory 60 in order to allow high speed communication between the operating system 64 and the CPU 52. A support system interface 68 interconnects the computer system 50 to a support system (not shown) in order to provide operation, administration, maintenance, and provisioning capabilities, as is common in a server architecture. A network interface 70 interconnects the computer system 50 to the communication network 12 (FIG. 1). Other standard interfaces, including serial and parallel interfaces, are provided by standard interfaces 72. Lastly, a tape drive 74 and a disk drive 76 are provided for backup, and data and program storage capabilities, respectively.

Figure 3:
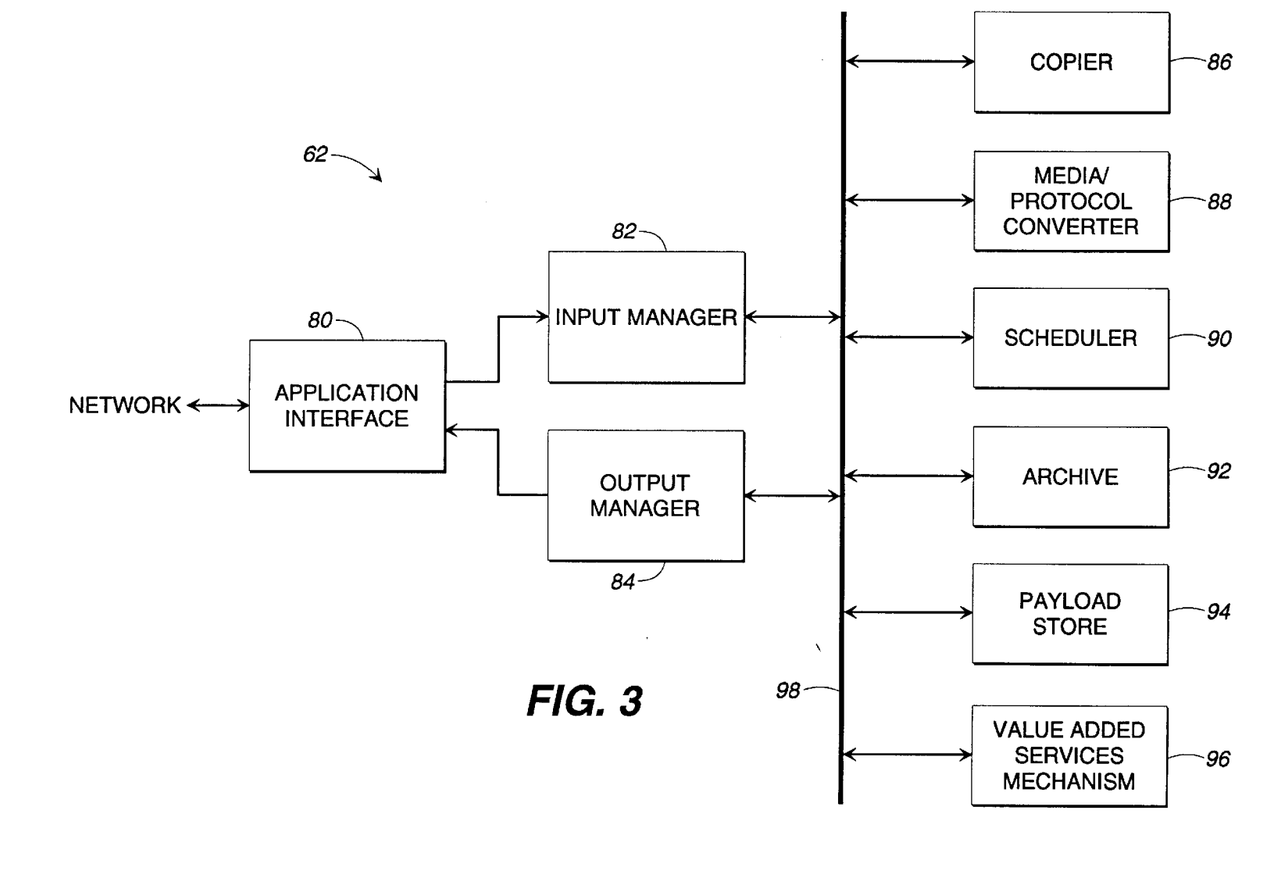
FIG. 3 is a block diagram of the architecture and functionality of the payload delivery system of FIG. 2.

With reference now to FIG. 3, the payload delivery system 62 comprises an application interface 80, an input manager 82, an output manager 84, a copier 86, a media/protocol converter 88, a scheduler 90, an archive 92, a payload store 94, and a value added services mechanism 96. The application interface 80 interconnects the payload delivery system 62 to the communication network 12 for receiving and sending payloads via the network interface 70. The network interface 70 (FIG. 2) may indeed be a component of the application interface 80. In specific regard to the payloads received by the application interface 80, the application interface 80 checks them for adherence to the protocol and for correctness (e.g., to determine if there is any missing or corrupted information, or to check for adherence to protocols). The payloads received by the application interface 80 are sent to an input manager 82 where they are processed.

The input manager 82 processes payloads, routing them to an appropriate functional module such as the copier 86, the media/protocol converter 88, the scheduler 90, the archive 92, the payload store 94, or the value added services mechanism 96. The input manager 82 is interconnected with each of the aforementioned functional modules via a bus 98.

The copier 86 is provided to copy the payload for enabling distribution of the payload to more than one recipient, as will be discussed in greater detail below.

The media/protocol converter 88 is provided to convert the media of the payload from its originating media to one or more alternate media as designated by the sender in the delivery parameters or as otherwise necessary to complete delivery. It should be noted that this can entail the conversion of the entire payload, or only a portion of the payload, in order to effectuate delivery. In addition, the media/protocol converter 88 converts the particular protocol of a payload as necessary when the payload delivery system 62 detects an incompatibility between protocols. It should also be noted that media and/or protocol conversion can take place pre- and/or post-delivery, and at any one or more of the locations where the payload delivery system resides.

The scheduler 90 manages the internal processing of payloads in the payload delivery system 62. For example, the scheduler 90 may, subject to the parameters specified by the sender, schedule a message to take advantage of tariff structure to the benefit of the sender.

The archive 92 provides a mechanism for storing payloads for extended periods of time, at least more than the period of time required for delivery of the payload.

The payload store 94 provides a mechanism for storing the payload during transmission and/or reception as necessary in the delivery of the payload to the recipient. This will become more apparent upon the following discussion regarding the operation of the payload delivery system 62.

The value added services mechanism 96 is included to provide one or more standardized communication services such as Directory Services, Business/Accounting Services, Security Services, Compression Services, or Language Services. The Directory Services, as delineated in X.500 series of ITU Standards, enables transparent address translation services to the users. The Business/Accounting Services provides for the recording of the details of the delivery that are subsequently used for system analysis, upgrades, and the generation of billing for the services rendered. The Security Services include, but are not limited, to providing encryption, authentication, and/or validation services for the users. The Compression services provide compression appropriate to the payload (e.g., voice compression, video compression, or data compression), enabling efficiencies in storage and transmission. Lastly, the Language Services provide for the conversion of the payload from one language to another.

The output manager 84 processes all outgoing messages including payloads and notices to the sender, and sends the same to the application interface 80.

II. Operation

Figure 4:
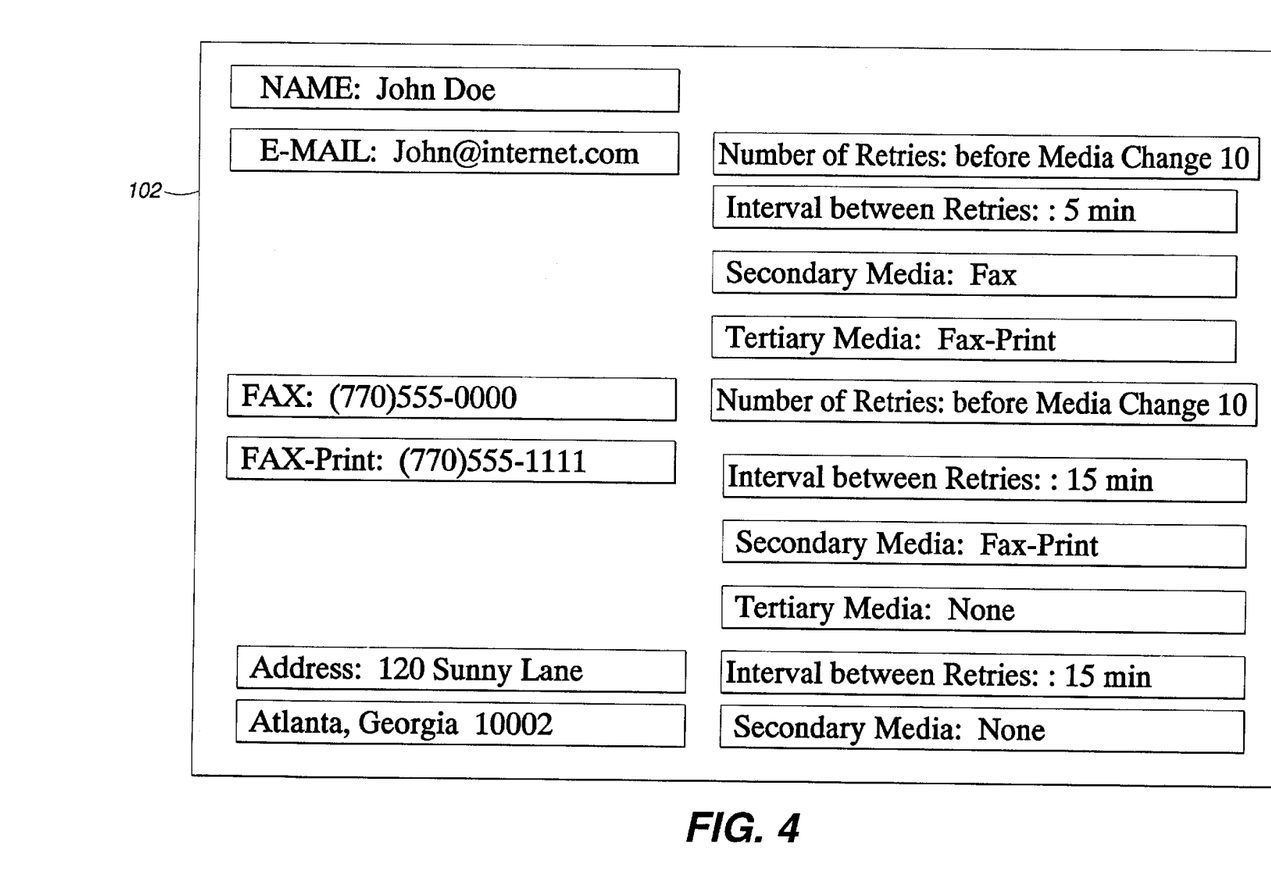
FIG. 4 is an illustrated database entry for a recipient that establishes the delivery parameters of a payload for use with the delivery system of FIG. 2.

The payload delivery system of the present invention transfers the payload using multiple communication methods, following the rules established by the user for transmission via the delivery parameters. The delivery parameters are preferably set forth in a payload entry associated with the recipient, such as the payload entry 102 illustrated in FIG. 4. It is preferred that the user establish a database of payload entries 102, specifying the applicable communication methods to be used when communicating with the respective recipients, for instance, e-mail, fax, postal, address, telephone number, etc., and a preferred method of communication with the appropriate backup methods (i.e., a secondary media with parameters, a tertiary media and parameters, etc.). For delivery to a postal address, the user specifies a specific carrier such as United States Postal Service, United Parcel Service (UPS), or Federal Express. Thus, once the user has generated a particular payload, the communication can be sent by merely selecting the name of the recipient from the user's database, as is presently done with address books associated with most e-mail applications. As shown in FIG. 4, the name, e-mail address, fax number, fax-print number, and post office address are provided for the delivery parameters by the payload entry 102. Note that this information is recipient specific.

In addition to the recipient specific information provided by the entry 102, payload delivery specific information is also provided, such as the number of retries before a media change, the intervals between media retries, a secondary media, a number of retries with the secondary media, the intervals between retries with the secondary media, a tertiary media, a number of retries with the tertiary media, and the intervals between retries with the tertiary media, and so forth and so on. The aforementioned information comprises the delivery parameters defined by the sender. This is an important aspect of the present invention in that the sender is given the ability to set the delivery parameters of the payload which the sender typically compiled and/or is fully knowledgeable of the contents. Moreover, the sender is usually the one who bears the cost of delivery. Thus, the sender is the best person to set the delivery parameters. Other delivery parameters (not shown) can include, for example, the time for delayed delivery or the tariff to be used (media specific). Yet another delivery parameter that is not incorporated into the entry 102 is the capability of allowing the user to group recipients for delivery of a single payload to multiple recipients.

The capability of having the sender set the delivery parameters is particularly significant in the situations where the payload includes data in more than one format, for instance, an e-mail with a first portion compiled in text and a second portion compiled in a spread sheet. In this situation, the e-mail may not be suitable for conversion into a voice message via character recognition because the spread sheet would be lost. However, with the present invention, the sender is aware of this and would most likely designate a secondary media such as fax that would be compatible with both the text and spreadsheet portions of the e-mail. Accordingly, the present invention is able to guarantee delivery of the entire payload, not just that portion compatible with the recipient's system. Alternatively, the payload delivery system with the present invention may be configured to convert the second portion (i.e., the spread sheet) of the e-mail into a fax and the first portion of the e-mail into a voice message (or some other media). Thus, the present invention is able to guarantee delivery of the entire payload to the recipient by matching the available media of the recipient to that which is compatible with the payload.

As illustrative examples of payload delivery with the payload delivery system 62 of the present invention, the following discussion addresses four delivery scenarios as illustrated in FIGS. 5–9. For reasons of brevity, it is assumed that the sender and recipient are both operating from stand alone workstations 30, 36 (FIG. 1), and that the payload delivery system 62 is operating on both workstations 30, 36 and on both of the local servers 28 (FIG. 1) that are connected to the local digital switches 24, 26.

In general, the user initially creates a message for delivery, including filling out a payload entry 102 (FIG. 4) having the delivery parameters for that payload. The user then sends the message. The message is received by the output manager where it is classified with other outgoing messages based upon the method of delivery. If the message is for delivery to a postal address, based on the carrier specified in the recipient's address, the output manager determines the carrer's point of presence (POP) and proximity to the recipient. Then an e-mail or fax is sent to this point of presence where manual delivery to the recipient is effectuated. In the case of manual delivery, a sender is notified when the delivery is done, not when the carrier receives the e-mail or fax. The sender may not have to know the details of the carrier (e.g., address, fax number, e-mail address), relying on the value added services mechanism 96 to provide this information, based on the address(es) of the recipient. In order to address the carrier concerns and ensure that the payload is not divulged in route, the service requires a specific type of secure form to be used. This is preferably a two-page, sealed form that allows the text to appear on the inside while the details of the recipient (e.g., address, phone number) are provided in the appropriate place on the top of the first page. In order to read the payload inside, a seal has to be broken. In addition, appropriate handshakes between the POP and the delivery manager would ensure that duplicate messages can not be created.

Regardless of the method of delivery, the response received by the input manager regarding the delivery of the message is provided to the sender. Furthermore, the user can at anytime query the output manager to determine the status of the delivery. In addition to notifying the user that the message was delivered to the recipient, it may be preferred at times to notify the user of the methods used other than that of the native media. The method of providing the notification that is performed by the output manager is dependent on the payload-transport technology. As an example, the notification may be achieved with messages on the D-channel of integrated service digital network (ISDN), with little to no overhead in order to provide a great utility value to the end user. With a technology such as wireless, the notification can be achieved by out-of-band signaling, while in other technologies the notification can be achieved with in-band signaling.

Figure 5:
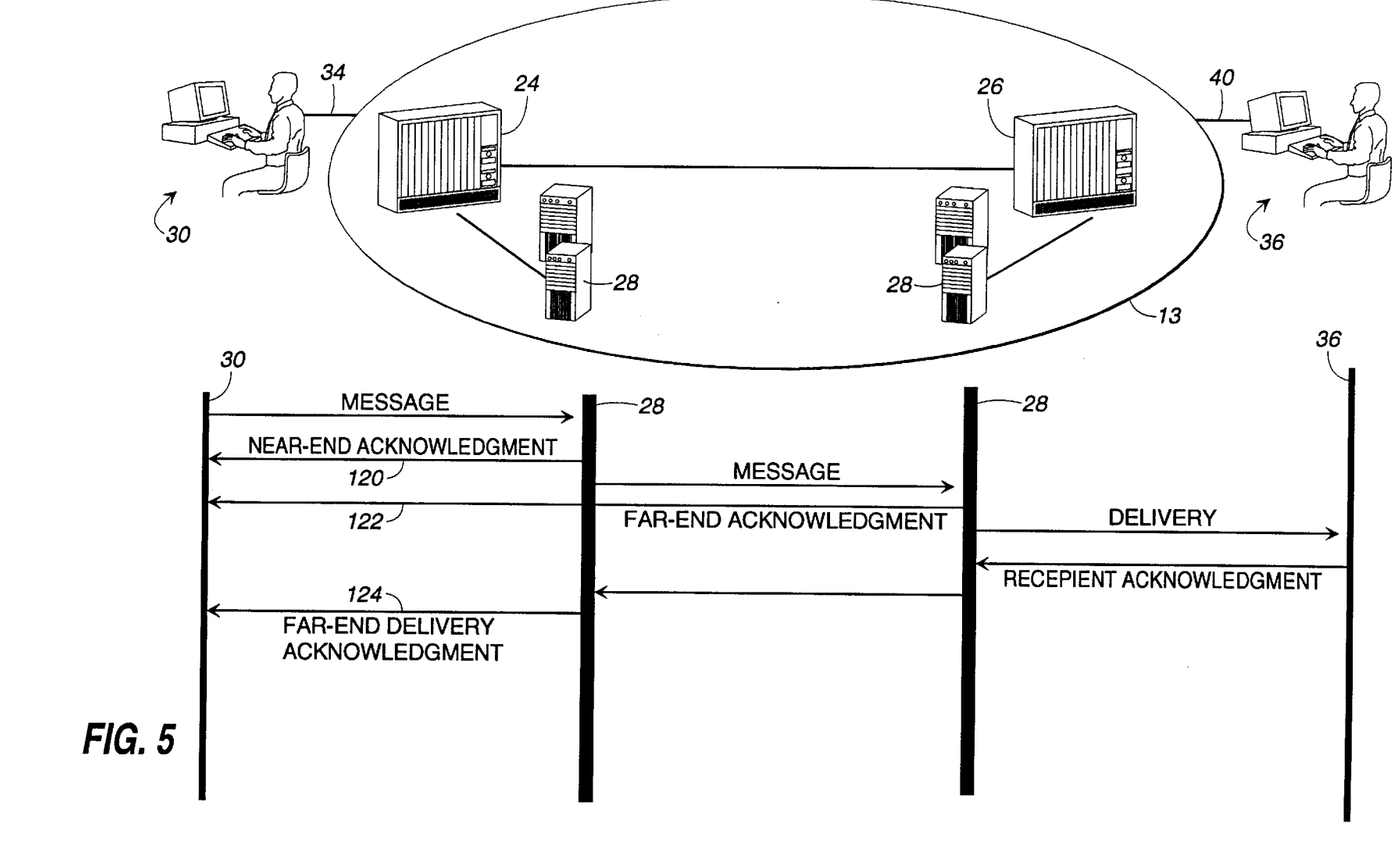
Figure 6:
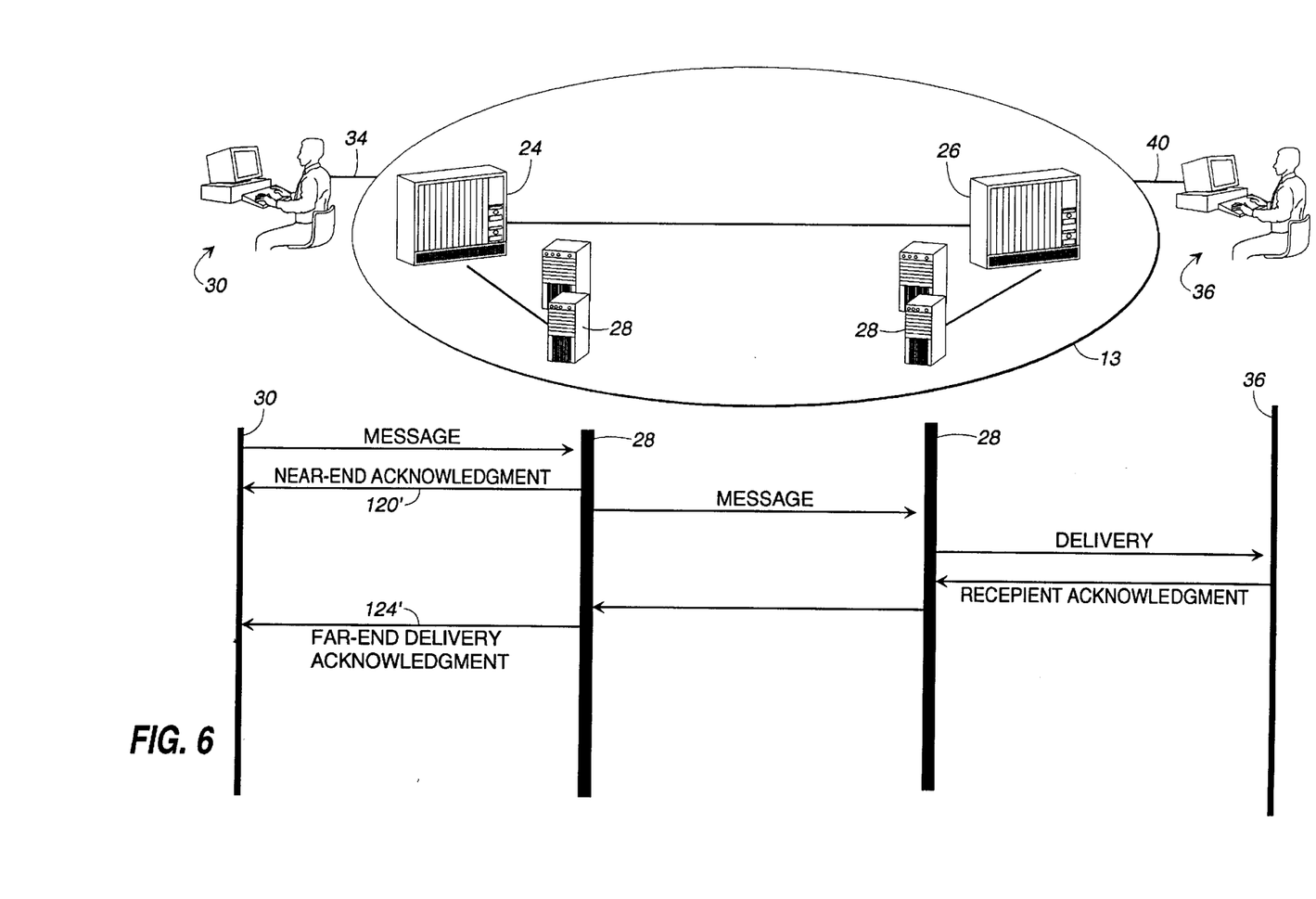

With reference to FIGS. 5 and 6, shown are two instances of delivery for a single-recipient case. In FIG. 5, the payload delivery system 62 receives a near-end acknowledgment 120 when the near-end server 28 receives the payload, a far-end acknowledgment 122 when the payload is delivered to the far-end server, and a far-end acknowledgment of delivery 124 finally when the end-user server receives the payload. At the near-end, the payload delivery system 62 makes an intelligent choice of whether the message should be replicated for multiple recipients, thereby managing the bandwidth of the backbone network.

In FIG. 6, the payload delivery system 62 provides the user with a near-end acknowledgment 120' when the near-end server receives the payload, and a far-end acknowledgment of delivery 124' when the end-user receives the payload, without the intermediate server-server specific acknowledgments. As a part of the present invention, the user is be able to select the notification method, i.e., either that shown in FIGS. 5 or 6.

Figure 7:
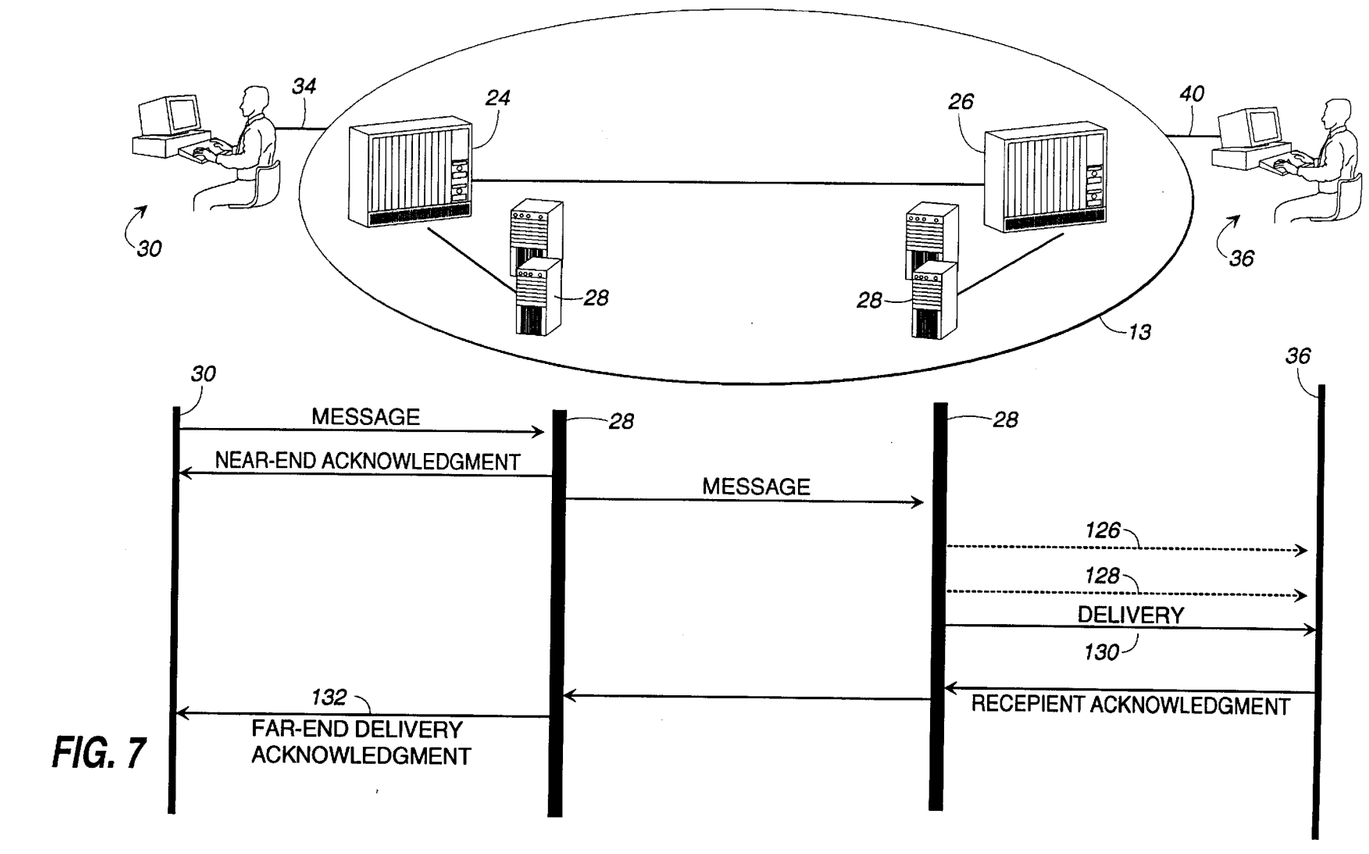

With reference to FIG. 7, shown is an instance where multiple attempts are made in a manner that is transparent to the user in order to complete delivery. As shown, following an unsuccessful delivery attempt 126 initially, retries 128, 130 are made before delivery is completed by attempt 130. Following delivery, a far-end acknowledgment of delivery 132 is received by the user.

Figure 8:
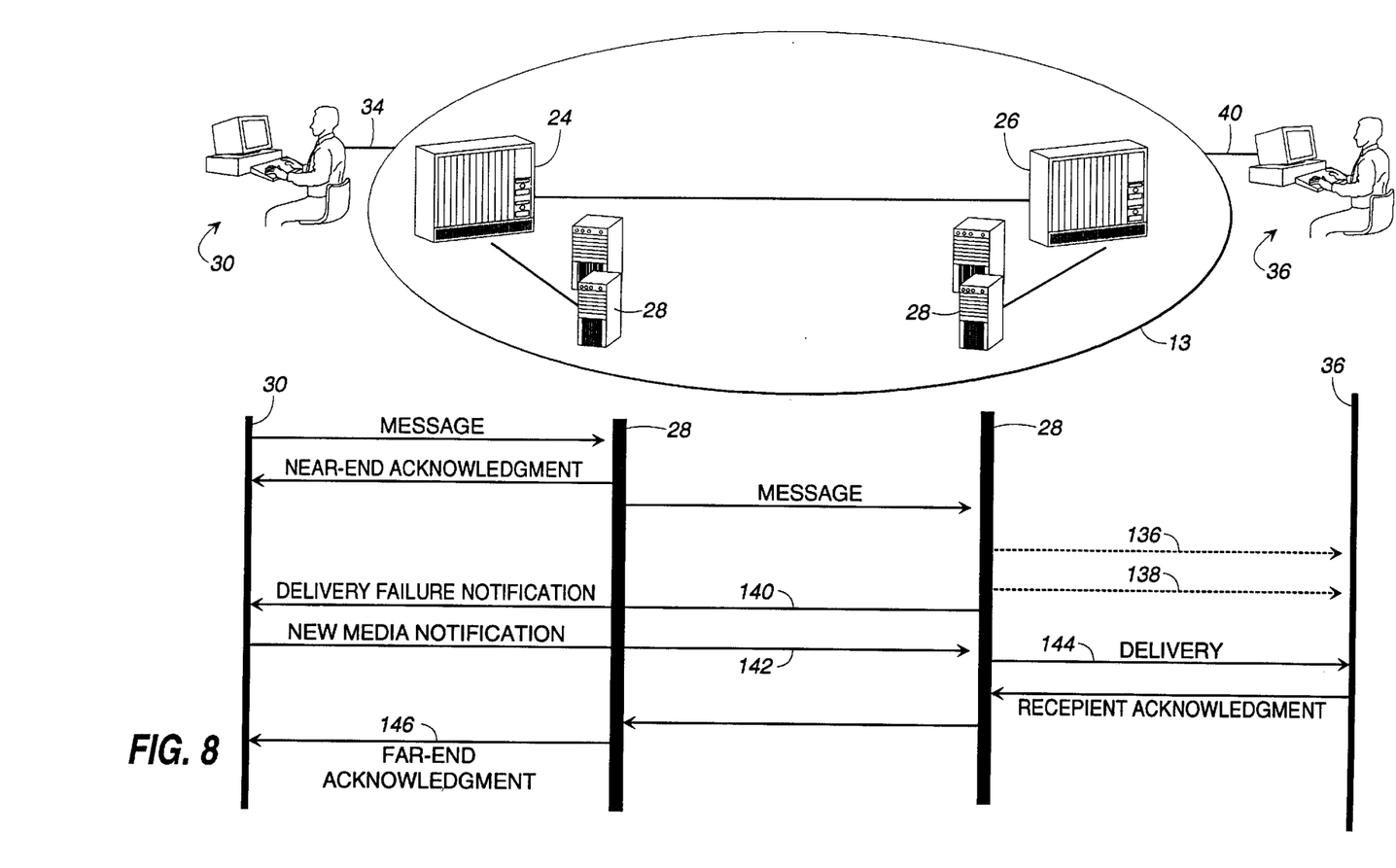

With reference to FIG. 8, shown is an instance where multiple attempts are made before a media conversion is made at the far-end server 28, in accordance with the delivery parameters defined by the sender. As shown, following an unsuccessful delivery attempts 136, 138, notification 140 is received by the user. The payload delivery system 62 responds to the notification 140 by sending a new media notification 142 which results in the far-end server 28 performing a media conversion. Subsequently, delivery with the new media is completed with attempt 144 and a far-end acknowledgment of delivery 146 is received by the user.

Figure 9:
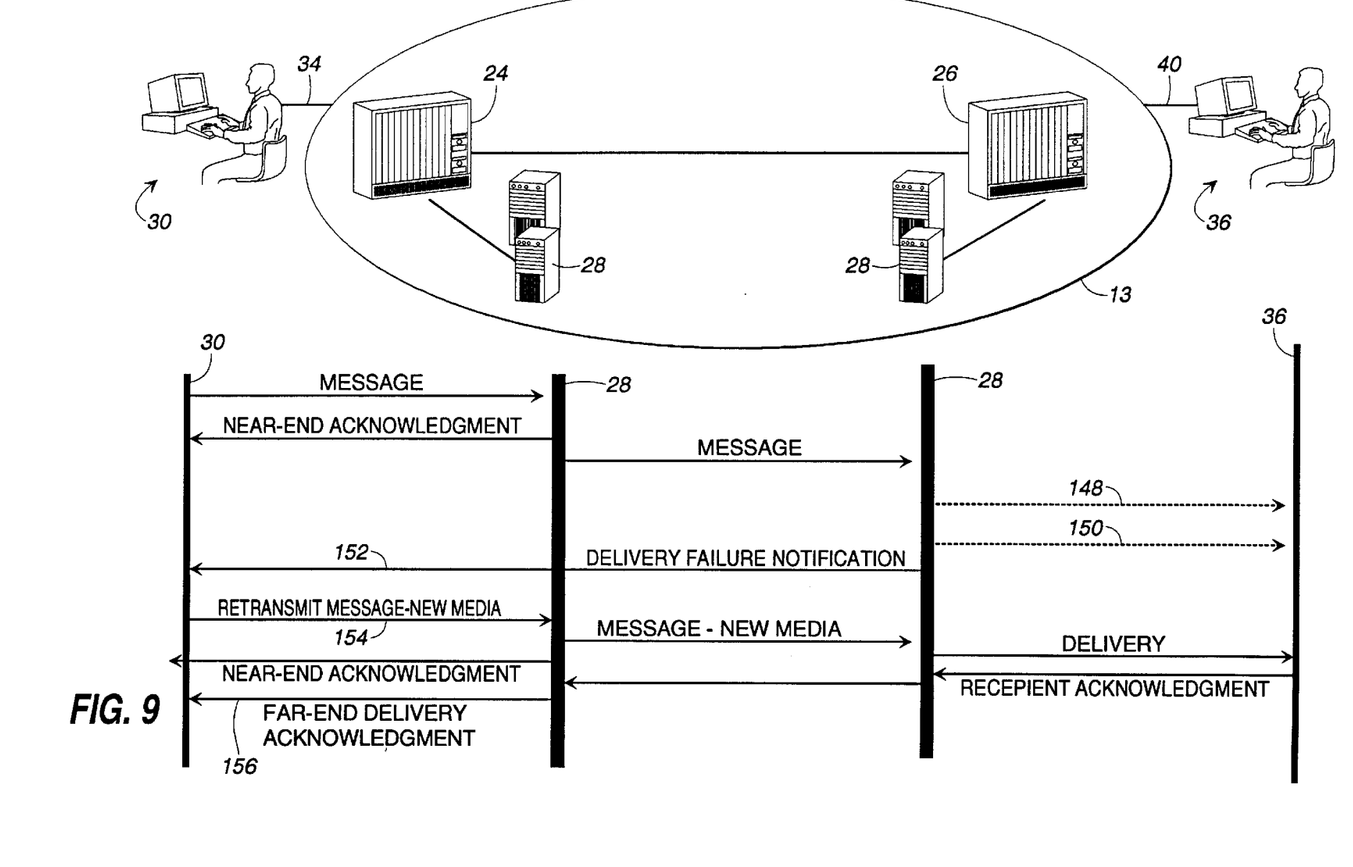

With reference to FIG. 9, shown is an instance where multiple attempts are made before a media conversion is made at the sender's workstation 30, in accordance with the delivery parameters defined by the sender. As shown, following an unsuccessful delivery attempts 148, 150, notification 152 is received by the user. In this case, the payload delivery system 62 responds by performing a media conversion at workstation 30 and retansmitting the payload in the new media via attempt 154 which is then successfully delivered. The user subsequently receives a far-end acknowledgment of delivery 156.

The multi-recipient case is an extension of the single-extension case with the required extension of payload duplication. The functionality that is required to realize this concept is distributed across the client and the server. More particularly, this exact functionality depends on the factors of optimization (i.e., network bandwidth, cost of client, server, delays, security, etc.).

Figure 10:
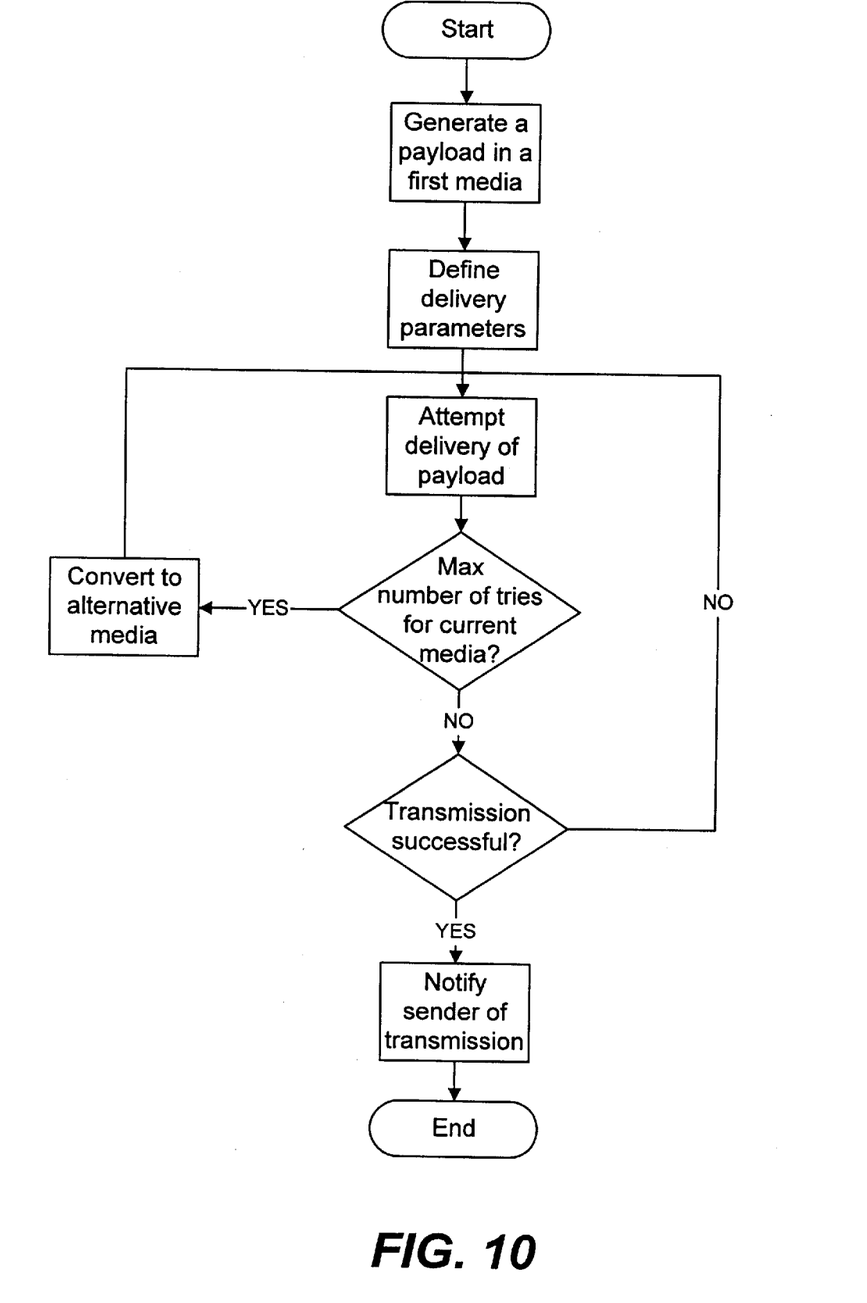
FIG. 10 is a flow chart illustrating the methodology and functionality of the present invention.

It should be noted that the methodology and functionality of the present invention is illustrated in the flow chart of FIG. 10.

In concluding the detailed description, it should be noted that it will be obvious to those skilled in the art that many variations and modifications may be made to the preferred embodiment without substantially departing from the principles of the invention. All such variations and modifications are intended to be included herein within the scope of the present invention, as set forth in the following claims. Further, in the claims hereafter, the structures, materials, acts, equivalent of all means or step plus function elements are intended to include any structures, materials, or acts for performing the recited functions in combination with other claimed elements as specifically claimed.

Wherefore, the following is claimed:

1. A payload delivery system for providing guaranteed end-to-end delivery of a payload from a sender to a recipient, said payload being delivered via one or more communication networks, said system comprising:

means for generating a payload in a first media;

means for defining payload delivery parameters by said sender;

means for converting said payload to an alternative media at different locations as necessary for completion of delivery over one of said communication networks; and means for automatically notifying said sender upon receipt of said payload by said recipient.

2. The payload delivery system of claim 1, further comprising second means for converting said payload to said alternative media, said second means for conversion being remotely located with respect to said first means for conversion.

3. The payload delivery system of claim 1, further comprising means for administering media conversion from said first media to said alternative media for completion of delivery of said payload to said recipient.

4. The payload delivery system of claim 1, wherein said payload delivery parameters include a number of delivery retries before said media conversion to said alternative media.

5. The payload delivery system of claim 1, wherein said payload includes an e-mail message.

6. The payload delivery system of claim 1, wherein said payload includes a fax.

7. The payload delivery system of claim 1, wherein said payload includes an audio file.

8. The payload delivery system of claim 1, wherein said payload includes a video file.

9. The payload delivery system of claim 1, wherein said payload includes a paging message.

10. The payload delivery system of claim 1, wherein said payload includes a sealed security letter.

11. The payload delivery system of claim 1, wherein said one of said communication networks is a local area network.

12. The payload delivery system of claim 1, wherein said one of said communication networks is regional network.

13. The payload delivery system of claim 1, wherein said one of said communication networks is an international network.

14. The payload delivery system of claim 1, wherein said one of said communication networks is an Internet.

15. The payload delivery system of claim 1, wherein said one of said communication networks is a Information Superhighway.

16. The payload delivery system of claim 1, wherein said one of said communication networks is a paging network.

17. The payload delivery system of claim 1, further including at least one value-added service.

18. The payload delivery system of claim 1, wherein said payload delivery system is located at a workstation of said sender.

19. The payload delivery system of claim 1, wherein said payload delivery system is located in a local area network.

20. The payload delivery system of claim 1, wherein said payload delivery system is located in a wide area network.

21. The payload delivery system of claim 1, wherein said payload delivery system is located at more than one location.

22. The payload delivery system of claim 1, wherein said payload comprises more than one portion with at least two said portions in a different media, and wherein said means for converting said payload is configured to convert respective said portions of said payload into different media independent of one another.

23. A payload delivery method for providing guaranteed end-to-end delivery of a payload from a sender to a recipient, said payload being delivered via one or more communication networks, comprising the steps of:

generating a payload in a first media;

defining payload delivery parameters by said sender;

converting said payload to an alternative media at different locations as necessary for completion of delivery of said payload; and automatically nosing said sender upon receipt of said payload by said recipient.

24. The method of claim 23, further comprising the step of administering media conversion from said first media to said alternative media for completion of delivery of said payload to said recipient.

25. The method of claim 23, wherein the step of defining payload delivery parameters comprising the step of defining a number of delivery retries before a media conversion to said alternative media.

26. The method of claim 23, wherein the step of converting said payload to said alternative media comprises the step of converting said payload from said first media into an e-mail.

27. The method of claim 23, wherein the step of converting said payload to said alternative media comprising the step of converting said payload from said first media into a fax.

28. The method of claim 23, wherein the step of converting said payload to said alternative media comprising the step of converting said payload from said first media into a sealed security letter.

29. The method of claim 23, further including the step of performing a value added service.

30. The method of claim 23, wherein the step of converting said payload to alternative media results in a notification to said sender of said conversion.

31. The method of claim 23, wherein an unsuccessful delivery results in a notification to said sender.

32. The method of clam 23, wherein said step of notifying said sender includes requesting said sender to send new instructions on delivery methods.

33. The method of claim 23, wherein the sender queries an input manager on a status of said payload delivery.

34. The method of claim 23, wherein said payload comprises more than one portion with at least two said portions in a different media, and wherein said step of converting said payload includes converting said portions of said payload independent of one another.

35. The method of claim 23, wherein said payload delivery parameters includes an ability to group a plurality of recipients of said payload for delivery.

36. A payload delivery method for providing guaranteed end-to-end delivery of a payload from a sender to a recipient, said payload being delivered via one or more communication networks, comprising the steps of:

generating a payload in a first media;

defining payload delivery parameters by said sender;

converting a portion of said payload to an alternative media as necessary for completion of delivery of said payload; and automatically notching said sender upon receipt of said payload by said recipient.

37. The method of claim 36, further comprising the step of administering media conversion from said first media to said alternative media for completion of delivery of said payload to said recipient.

* * * * *

UNITED STATES PATENT AND TRADEMARK OFFICE
CERTIFICATE OF CORRECTION

PATENT NO. : 5,826,034
DATED : October 20, 1998
INVENTOR(S) : Albal

It is certified that error appears in the above-identified patent and that said Letters Patent is hereby corrected as shown below:

In the Abstract, the second appearance of "method" is corrected to "media".

In column 6, line 10 – "utilize" is corrected to "utilized".

In column 10, line 59 – "retansmitting" is corrected to "retransmitting".

In column 11, line 62 – "a" is inserted between "is" and "regional".

In column 12, line 2 – "a" is corrected to "an".

In column 12, line 32 – "nosing" is corrected to "notifying".

In column 12, line 39 – "comprising" is corrected to "comprises".

In column 12, line 47 – "comprising" is corrected to "comprises".

In column 12, line 51 – "comprising" is corrected to "comprises".

UNITED STATES PATENT AND TRADEMARK OFFICE
CERTIFICATE OF CORRECTION

PATENT NO. : 5,826,034
DATED : October 20, 1998
INVENTOR(S) : Albal

It is certified that error appears in the above-identified patent and that said Letters Patent is hereby corrected as shown below:

In column 14, line 4 – "notching" is corrected to "notifying".

Signed and Sealed this

Thirteenth Day of April, 1999

Attest:

Q. TODD DICKINSON

Attesting Officer

Acting Commissioner of Patents and Trademarks